United States Patent
Zimmermann et al.

(10) Patent No.: US 11,316,856 B2
(45) Date of Patent: Apr. 26, 2022

(54) TRANSPARENCY MECHANISM FOR THE LOCAL COMPOSITION OF PERSONAL USER DATA STORED IN A DISTRIBUTED FASHION

(71) Applicant: Robert Bosch GmbH, Stuttgart (DE)

(72) Inventors: Christian Zimmermann, Stuttgart (DE); Jan Zibuschka, Magstadt (DE); Ralph Retter, Stuttgart (DE); Sebastian Schuster, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 16/665,556

(22) Filed: Oct. 28, 2019

(65) Prior Publication Data
US 2020/0153828 A1    May 14, 2020

(30) Foreign Application Priority Data
Nov. 8, 2018 (DE) .......................... 102018219067.4

(51) Int. Cl.
*G06F 7/04*    (2006.01)
*G06F 15/16*    (2006.01)
(Continued)

(52) U.S. Cl.
CPC ...... *H04L 63/0884* (2013.01); *H04L 63/0807* (2013.01); *H04L 63/0815* (2013.01); *H04L 63/0892* (2013.01)

(58) Field of Classification Search
CPC ............. H04L 63/0884; H04L 63/0807; H04L 63/0815; H04L 63/0892; H04L 63/08;
(Continued)

(56) References Cited

U.S. PATENT DOCUMENTS

2008/0140642 A1* 6/2008 Messing ............. G06F 16/9535
2014/0040373 A1* 2/2014 Takamatsu ............. H04L 67/02
709/204
(Continued)

FOREIGN PATENT DOCUMENTS

| EP | 0978976 A2 | 2/2000 |
| EP | 1524608 A2 | 4/2005 |
| WO | 2015102872 A1 | 7/2015 |

OTHER PUBLICATIONS https://tools.ietf.org/html/rfc6749, downloaded on Oct. 28, 2019.
(Continued)

*Primary Examiner* — Amie C. Lin
(74) *Attorney, Agent, or Firm* — Norton Rose Fulbright US LLP; Gerard Messina (57) ABSTRACT

A system and method for a client computer for the local composition of a data page having personal user data for services accessed by the user and provided on a number of servers. The method includes: setting up a central access server from among the servers; setting up a query for the composition of the data page, for a transmission from the client computer to the central access server; receiving a processing element, which includes a visual element and access addresses to the servers that are relevant for the query, the processing element including control commands processed by the client computer, and queries of the client computer to the access addresses included in the processing element being coordinated so that the personal user data on the servers to be aggregated for the composition of the data page are delivered directly to the client computer for the local composition.

16 Claims, 4 Drawing Sheets

(51) Int. Cl.
*G06F 17/30* (2006.01)
*H04L 29/06* (2006.01)

(58) Field of Classification Search
CPC ..... H04L 67/02; H04L 67/1097; H04L 67/42; G06F 21/604; G06F 21/6218
See application file for complete search history.

(56) References Cited

U.S. PATENT DOCUMENTS

| | | | |
|---|---|---|---|
| 2015/0120650 A1* | 4/2015 | Seay | G06Q 30/01 707/610 |
| 2016/0171513 A1* | 6/2016 | Takeda | H04L 67/1002 705/7.29 |
| 2018/0315044 A1* | 11/2018 | Schukai | G06Q 20/3827 |

OTHER PUBLICATIONS https://www.w3schools.com/tags/tag_iframe.asp, downloaded on Oct. 28, 2019.
https://www.html5rocks.com/de/tutorials/internals/howbrowserswork/, downloaded on Oct. 28, 2019.
http://www.w3schools.com/tags/ref_httpmethods.asp, downloaded on Oct. 28, 2019.

\* cited by examiner

TRANSPARENCY MECHANISM FOR THE LOCAL COMPOSITION OF PERSONAL USER DATA STORED IN A DISTRIBUTED FASHION

CROSS REFERENCE

The present application claims the benefit under 35 U.S.C. § 119 of German Patent Application No. DE 102018219067.4 filed on Nov. 8, 2018, which is expressly incorporated herein by reference in its entirety.

FIELD

The present invention relates to a method, a computer program and a system for the local composition of a data page with different personal user data on a client computer, the composition of the data page requiring the reading in and compiling of a plurality of authorization-requiring data sets of different servers of a user.

BACKGROUND INFORMATION

In the related art, a mechanism is provided for producing a compilation of user data of the organization-internal Google applications employed by the user from the dashboard system by Google, for instance. Via the dashboard, the user can view and manage "his" user data and settings (of one and the same organization, which are all Google services in this case). As soon as the user has logged in to the Google account, the user can click on a button on the website in order to call up the dashboard function. In practice, however, it has been found that a user is typically registered with a plurality of organizations or services (e.g., navigation services, diagnostic services, information services, etc.). In view of this situation, it is therefore desirable if a user had secure access to "his" personal user data at the different services of which the user avails himself.

European Patent No. EP 1 524 608 B1 describes a communications system for managing and supplying data in computer networks.

European Patent Application No. EP 0 978 976 A2 relates to an application distributor for a server application and to a related data exchange between the client and the server.

SUMMARY

It is desirable to increase the security of an access to user data that are stored on different application servers. This is achieved by a solution according to the present invention. Advantageous example embodiments of the present invention result from the description herein.

According to a first aspect, the present invention relates to a method for a client computer for the local (i.e., on the client computer) composition of personal user data for a number of services accessed by a user. The (typically multiple) services are provided on different servers (application servers) and/or in different organizations. The composition is a compilation of all or selected personal user data of the utilized different applications. The composition may be implemented on a data page (e.g., on an internet page such as in an HTML format). A central access server from among the number of servers is defined for the present method (preferably in advance) and made available in a configured form. The central access server serves as an access node for the client computer for the central coordination of the accesses to the other servers. The method includes the following method steps:

Setting up a query for the composition of the data page, the query being prepared for a transmission from the client computer to the central access server;

Receiving a processing element in response to the query, the processing element including at least one visual element and access addresses (e.g., references, links) to the respective servers from among the number of servers that are relevant for the query, i.e., for example, only the servers at which the user of the client computer is registered and/or, if the query has as its goal only a compilation of personal user data in a certain time period, then only the servers in which personal user data have arisen during this time period are relevant. The other servers are therefore considered irrelevant. The processing element furthermore includes control commands, which are processed by the client computer. The queries, being made by the client computer to the servers indexed in the processing element (or their access addresses), are coordinated in such a way that the personal user data on the relevant servers that are to be aggregated for the composition of the data page are supplied directly to the client computer for the local composition. The delivery of the personal user data of the servers to the client computer advantageously takes place without further log-in or registration or authorization procedures. It suffices if the client computer has authenticated itself in advance vis-à-vis the central access server. The authentication of the query by the client computers to the servers that are indexed in the access addresses (and on which the personal user data are stored) is carried out without a user interaction.

The above approach has the advantage that it allows a user to manage his personal user data of different application servers, which are typically operated by different organizations and require different authentications and registration procedures in each case (e.g., different passwords or keys), in a shared view, and thus in an integrated fashion, in a simple and secure manner, that is to say, to view, change and/or possibly delete the user data without having to log in, register and authenticate himself in a dedicated manner to/with the individual application.

Thus, the delivery of personal user data of the respective servers to the client computer may preferably take place without an individual, direct authentication of the client computer vis-à-vis the respective server. The authentication of the access (e.g., read and/or write access) to the individual servers using the relevant personal user data may be performed via a third party or indirectly, i.e., via a central authentication of the client computer vis-à-vis the central access server. This offers the advantage that the aggregation of personal user data of the different servers is able to be carried out in a fully automatic and uncomplicated manner, and in particular, without separate, individual registration processes at the respective servers. This also makes it possible to accelerate the present method considerably. The authentication of the query by the client computer to the servers consequently takes place indirectly via the central access server.

The central access server is preferably developed to instruct and to coordinate the (other) servers so that the (later) queries of the client computer to the servers are able to be carried out without an additional authentication.

The visual element may include at least one management element by which the user is able to individually manage, sometimes change, adapt and/or delete, his personal user data of the respective server at the client computer. This feature improves the functionality of the present method. However, it may also be the case that the visual element does not include such a management element so that it is only possible to view the respective personal user data. In addition, the management element may be made available only for selected server data so that first personal user data of a first server, for example, may only be read in (and thus are displayed without a management element on the data page), while second personal user data of a second server may be changed or deleted as well (and thus are indicated with the management element on the data page).

The processing element may optionally include further tokens for an authentication vis-à-vis the application servers. This makes it possible to increase the security of the method.

The compilation or composition of the personal user data (of the different servers) is able to be output in a shared and integrated display on a user interface. The composition may preferably be provided using a predefined data structure, in particular in the form of a data page. For example, the data page may be an internet page (e.g., in HTML or XHTML format, and thus in a hypertext markup language for structuring digital documents such as texts including hyperlinks). The personal user data are detected by the relevant servers as the result of the query to the respective servers on the client computer and embedded in the visual element. This offers the advantage that a unified structure is able to be predefined for the composition of the personal user data, which improves the application and the digital processing. The respective queries for acquiring the personal user data of the relevant servers required for the composition of the data page may preferably be authenticated. This increases the security of the present method. The authentication of the respective query to the relevant server may be performed via tokens which are made available to the client computer by the central access server. Other authentication types may be used as an alternative, including a possession-based authentication (e.g., key-based), an information-based authentication (password), and/or a user-based authentication, which requires the presence of the user (e.g., biometric methods). The present invention also encompasses a combination of the aforementioned options.

In an advantageous embodiment of the present invention, the client computer is able to communicate with the central access server using a single sign-on or identity management protocol, in particular an OAuth protocol. A single sign-on protocol means that a user, after a single authentication at a workstation, is able to access all computers and services to which he has local rights (authorizations) at the same workstation without having to log in anew every time. OAuth (open authorization) is an open protocol that enables a standardized, secure application-program interface (API) authorization for desktop, web and mobile applications. With the aid of this protocol, the user may give an application (in particular the application for executing the afore-described method) access (authorization) to his data that are provided by another service (server) without having to divulge confidential details of his access authorization (authentication). The user may therefore instruct other entities to utilize a service or to access the server in his name. This advantageously avoids the transmission of passwords to third parties (in this case, to the application for executing the method). The reason for this is that the personal user data has to be authorized as a rule and requires access rights. The use of a single sign-on or identity management protocol, and in particular the OAuth protocol, advantageously makes it possible for the client computer to dispense with a separate authentication vis-à-vis each individual server. The queries of the client computer to the respective server for access to the personal user data stored thereon thus do not require any individual log-in procedures at the respective servers. No user interaction is therefore required on the client computer once the query has been transmitted to the central access server. After the client computer has received the processing element, the method is able to run in a fully automatic manner and without any user interaction.

According to one advantageous embodiment, the processing element (having the at least one visual element and the access addresses of the relevant servers) may be developed as an HTML page including embedded frames that reference URLs. This constitutes a simple implementation variant.

Generally, the present method may be applied when the user uses a plurality of services of different servers, and the personal user data of the plurality of different servers thus have to be aggregated. This requires accesses (queries) to multiple servers. Accordingly, the processing element will include a plurality of access addresses of the relevant servers—possibly using further tokens. These access addresses have to be queried one after the other by the client computer or, alternatively, via parallel queries, in order to obtain the personal user data of the respective server. Thus, the client computer is induced, especially after receiving the processing element, to transmit authenticated queries (preferably via the tokens of the central access server) to the relevant servers in order to acquire the personal user data of the respective server. To control the sequence for access to the servers and the embedding of the respective result in the visual element, the processing element includes control commands. For example, the control commands may define when which server will be queried (prioritization of the queries) and/or in which form it is queried (e.g., additionally authenticated, etc.), and specify further criteria for the queries or for the composition. In one preferred embodiment, after all control commands included in the processing element have been processed, the visual element with the personal user data detected by the servers is able to displayed on a user interface of the client computer. The acquired personal user data of the different servers are preferably combined to form a shared visual element. This offers the advantage of improving the clarity for the user. In addition, the digital processing options may be improved by the provision in a data file.

The afore-described method may be implemented in the form of a computer program. According to one further aspect of the present invention, the approach provided here relates to a computer program for executing all of the method steps of a method as described above when the computer program is executed on a computer or on another electronic device, in particular as a browser application on the client computer.

The computer program may also be stored on a computer-readable memory medium. In addition, the computer program is able to be downloaded from a server. The computer program is preferably provided as a browser application on the client computer.

According to another aspect of the present invention, the application relates to a client computer which is able to be operated using a method as described in the previous text. In other words, the application thus relates to a client computer on which a computer program for executing the present method is implemented.

Above, the above approach was described on the basis of the example method. Features, advantages or alternative embodiments mentioned in this context are also transferrable to the other subject matters of the present invention, and vice versa. In other words, the system or a computer program product in accordance with the present invention may likewise be further developed using the features described in connection with the present method. The corresponding functional features of the present method are embodied by corresponding physical modules, in particular by hardware modules or microprocessor modules, of the system and/or the product, and vice versa.

According to a further aspect, the present application relates to a system for the local composition of a data page on a client computer, the data page being a composition of personal user data for a number of services, including:

the client computer, which includes a client-side access interface for the interaction with the central access server, and furthermore is in a data exchange with the number of servers;

a number of servers which provide the number of services to the user for use on the client computer;

a central access server, which is defined from among the number of servers and set up to function as an access node for the client computer, the central access server including a server-side access interface for the interaction with the client computer; the client computer being developed to generate a query for the composition of the data page and to send it to the central access server; and it is furthermore developed to receive a processing element in response to the query, which includes at least one visual element and access addresses to the particular servers from among the number of servers that are relevant for the query, the processing element furthermore including control commands that are processed by the client computer, and the central access server being developed to set up the servers so that the queries by the client computer to the access addresses of the servers included in the processing element are coordinated in such a way that the personal user data on the servers to be aggregated for the composition of the data page are delivered directly to the client computer for the local composition.

Below, the terminology used in this application will be described in greater detail.

The client computer may be an electronic device, sometimes a mobile user terminal (e.g., mobile phone, tablet, etc.) or a desktop computer or a computer server.

The term "data page" is to be understood as a compilation of digital data sets, which collect the personal user data of different servers, applications and/or databases. The data page may be developed as an internet page. Alternatively, it may be provided as a document (e.g., xml file). Since the format of the data page is freely selectable, the data page may also be referred to as a data structure. One advantage is that the personal user data collected from different sources are uniformly provided and displayed in a shared data structure in an integrated and standardized manner.

The composition means the aggregation or compilation of personal user data from different data sources (e.g., applications or databases, etc.). The composition is able to be provided in the form of a data file. The composition is part of data that mostly relate to one another from the content aspect (i.e., personal data that relate to one and the same user). The composition may be stored on a data carrier or storage medium. These data or this composition may thus exist beyond the runtime of a program (persistent) and are not lost at the program end. The program installed on the client computer is able to read in the composition and to display it on a user interface.

"Personal user data" are all data that have a relation to the user of the application such as personal data (place of birth, birth name and date, etc.), personal configurations and/or settings with regard to the application use, and/or further meta data from which personal data or data that should be protected are able to be calculated.

The services are preferably developed as computer programs or applications that run on different servers in each case. A first service thus runs on a first server (or a server network, e.g., in a first organization), a second service runs on a second server, etc. The services typically require different authorizations. In other words, the user uses different authentications (e.g., different passwords) for logging in to the server for the different services/servers. However, these are not required for the queries that are from the client computer to the servers according to the approach presented here. The personal user data are thus available in a distributed fashion on different computer entities with which the client computer is exchanging data via a network (e.g., the internet, but also LAN, WLAN or other networks). The individual servers need not necessarily be in a data exchange.

The processing element in accordance with the present invention may be developed as an electronic data file in a digital format, which is transmitted via a data transmission channel from the central access server to the client computer. The processing element is subdivided into a plurality of elements and includes at least one visual element, one or—usually—multiple access addresses, i.e., network addresses or links to (application) servers and, optionally, authentication elements such as in the form of tokens. These tokens are later used for the interaction-free authentication of the client computer vis-à-vis the servers. The tokens and values are transmitted from the distributed servers to the client computer. The central server transmits links and data types.

The visual element forms the frame for the display of the composition. The visual element includes control commands and specifications for the display of the compiled personal user data. For example, the visual element may encompass specifications pertaining to the format, the display instant, the size, position, etc. The visual element is able to be developed as an inline frame, which is embedded in an internet page (e.g., HTML).

The client computer and the central access server communicate via a network interface. To apply the method, the client computer must identify itself vis-à-vis the central access server, for which an authentication method is used.

However, a central aspect of the present invention is the log-in to the distributed servers with the aid of tokens. If the authentication is successful, the tokens are transmitted to the client computer so that the client computer may use them for an authentication vis-à-vis the (further) servers. For example, the OAuth protocol may be used for this purpose. The OAuth protocol is a standardized, secure API authorization for desktop, web and mobile applications. With the aid of this protocol, an end user (the user or owner of the personal user data) may give an application (e.g., on the client computer and/or on the central access server) access to his data (authorization) that are provided by another service (server), without divulging confidential details of his access right (authentication) to the client. This makes it possible for the end user to instruct third parties to avail themselves of a service in his name. The transmission of passwords to third parties is typically avoided.

The client-side access interface may be developed as a dashboard. The client-side access interface, for instance, is able to be developed as a graphical interface, which provides control buttons via which control commands for the management of the personal user data are able to be detected and/or set up (e.g., change, confirmation, deletion).

The server-side access interface may be developed as a web interface.

In the following detailed description of the figures, exemplary embodiments, which should not be considered a limitation, are described together with their features and additional advantages on the basis of the figures.

DETAILED DESCRIPTION OF EXAMPLE EMBODIMENTS

Below, the present invention is described in greater detail based on exemplary embodiments in connection with the figures.

In one exemplary embodiment, the present invention relates to the supply of what is known as a "transparency function". This means that the user may actually send a query to the system in order to manage his personal user data of the different services and servers, but that the implementation or execution of this query in terms of information technology remains hidden from the user. Instead, the user receives only the result with a compilation of personal user data relating to the user. His personal user data are thus made transparent and accessible to him without the user having to log in each time and individually authenticate himself with the different services.

Figure 1:
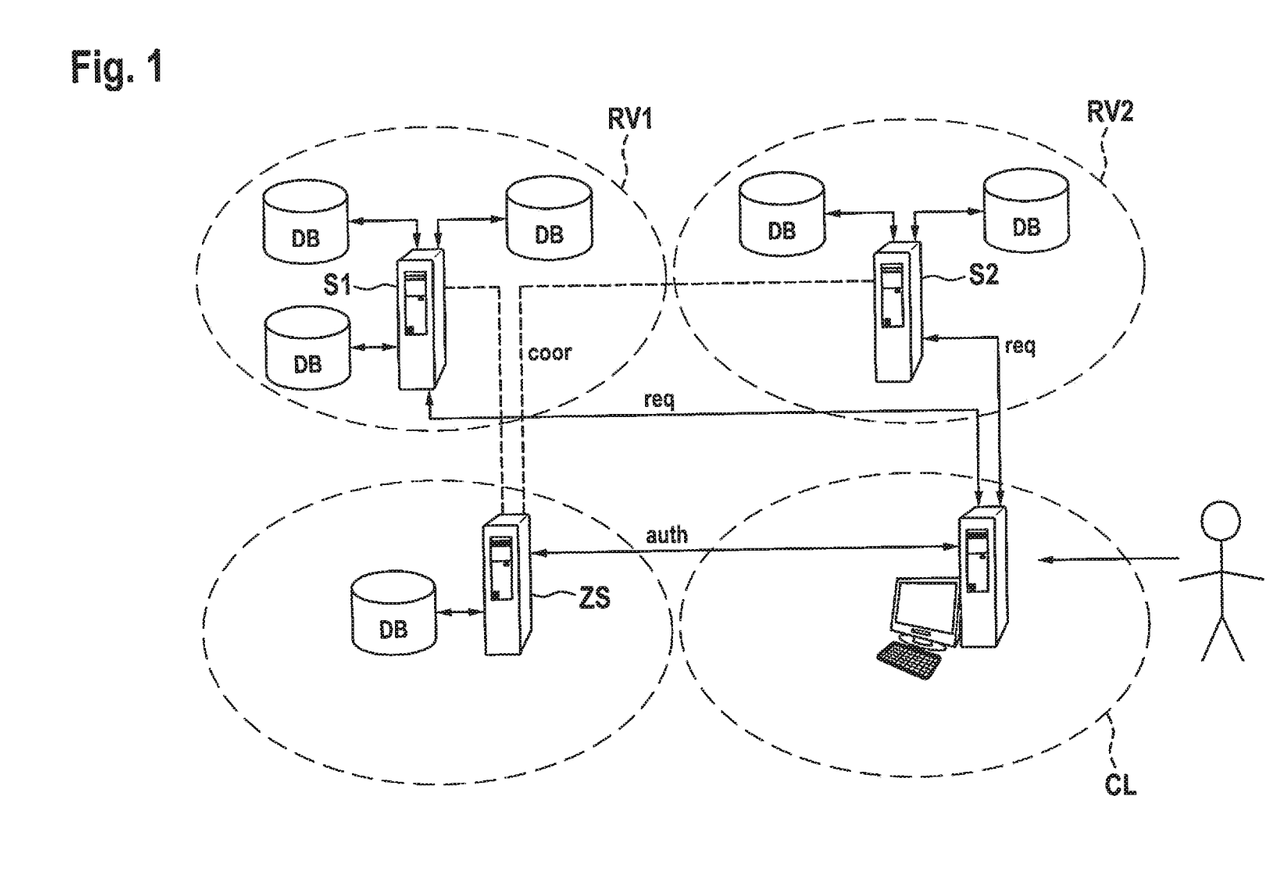
FIG. 1 shows a system according to an advantageous embodiment of the present invention with a network of application servers in a data exchange with a central access server and a client computer, in a schematic representation.

FIG. 1 schematically shows a network of servers S on which services are provided which are used by a user via his client computer CL, e.g., a navigation service, an email service, a storage service, a communications service for text messages, etc. The services run on different computer networks RV and require different log-in processes. For example, FIG. 1 shows a first computer network RV1, which is for supplying a first service on a first server S1, a second computer network RV2, which is for supplying a second service on a second server S2, etc. One server from among the number of servers S is selected for the method for producing the transparency on client computer CL, which serves as an entry point for the user and thus is developed as a central access node or central access server ZS. Central access server ZS coordinates the respective servers S in computer networks RV, in particular for the control of the data exchange between respective servers S and client computer CL, so that servers S supply the personal user data of the user directly to client computer CL in order to locally generate a shared overall image of all personal user data there. In the process, the user authenticates himself only once at central access server ZS via client computer CL. Client computer CL may then pose queries to relevant servers S for the purpose of obtaining the personal user data of the server. The compilation of the aggregated personal user data is carried out according to a predefined schema, which is defined by central access server ZS via what is known as a processing element VE (which will be described in greater detail in connection with FIG. 2). In FIG. 1, coordination accesses are shown in dashed form while the authentication and the queries to servers S for obtaining the personal user data are identified by solid lines. It is obvious that further servers S may be connected to the system and/or that the computer network may include further technical units. As a rule, a computer network RV includes at least one database DB in addition to server S.

Figure 2:
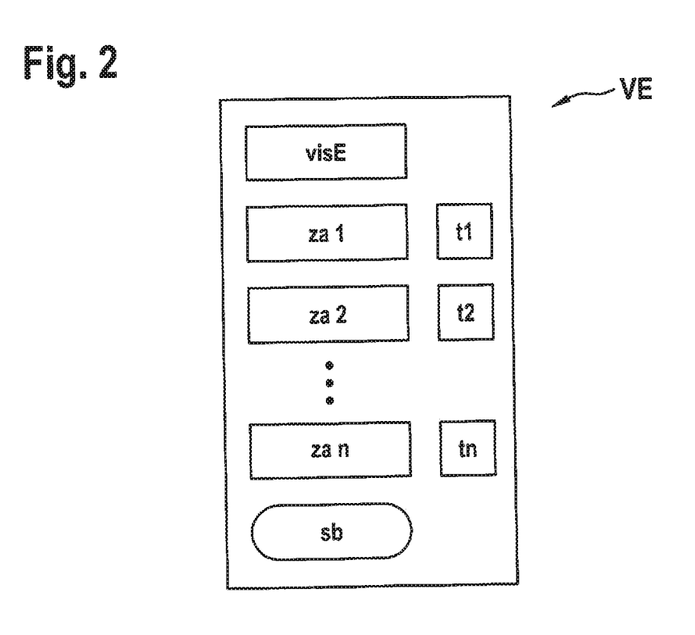
FIG. 2 shows a schematic representation of a processing element according to an advantageous embodiment of the present invention.

FIG. 2 shows a processing element VE in a schematic representation. In one preferred embodiment of the present invention, processing element VE includes a visual element visE and a plurality of access addresses za to servers S which is relevant for the query of the user. This will be a selection of servers S for which the user is registered or on which data are stored for the user. These are referred to as relevant servers. Access address za may reference respective server S in the form of a link or a URL or index it. Access to the server is able to be accomplished with the aid of access address za. Processing element VE may optionally also include an access authorization, e.g., in the form of a token t, to all or to selected access addresses. Processing element VE may optionally also include control commands sb, which control the processing of processing element VE on client computer CL, for instance in that they specify when which particular access is to be performed or define the sequence of the access.

Figure 3:
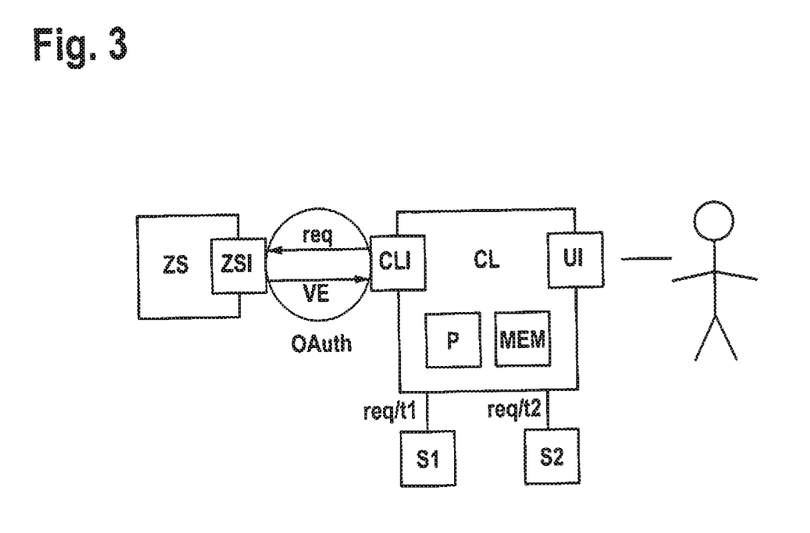
FIG. 3 shows structural entities for the data exchange between the central access server and the client computer with access to the further servers according to an exemplary embodiment of the present invention.

FIG. 3 shows the data exchange between client computer CL, central access server ZS and relevant application servers S in detail. To begin with, the user authenticates himself via a corresponding query at central access server ZS. Central access server ZS and client computer CL communicate via a server-side access interface ZSI and a client-side interface CLI. Following a successful authentication, a plurality of data units, in particular tokens t, are received in return by client computer CL from central access server ZS. Tokens t allow client computer CL to identify itself in subsequent method steps vis-à-vis the (other) servers S. The OAuth protocol, for example, may be used for that purpose, in particular a 'resource owner password credentials grant' from OAuth 2.0. Depending on the flow, additional complexities may arise. For example, it may happen that client computer CL first receives an intermediate item of information (access code), which it may or must exchange for a token t. Client computer CL then submits a query to central access server ZS for the composition of its personal user data, which is authenticated either by a token t or in some other form, and in return client computer CL receives a processing element VE (which forms the frame of the display, see FIG. 5), references to the relevant servers (or specific resources relating thereto with access addresses za) and, optionally, further token(s). Visual element visE and access addresses za, for instance, may involve an HTML page with embedded iFrames, which reference URLs.

In the next step, client computer CL sends queries to the different servers using received access addresses za, which are authenticated with the aid of tokens t (in FIG. 3: t1 for the queries to server S1, and t2 for the query to server S2). In return, it receives at least one visual element visE in each case (and potentially, further tokens t and addresses za). For example, visual element visE may be an HTML page. Client computer CL displays visual elements visE. At the earliest, it starts to do so after receiving central first visual element visE, which it received from central access server ZS, and it concludes once the last (visible to the user) embedded element has been received. The method is able to be carried out by a browser and may be developed to generate and parse a tree structure and to display the result on a user interface UI.

Figure 4:
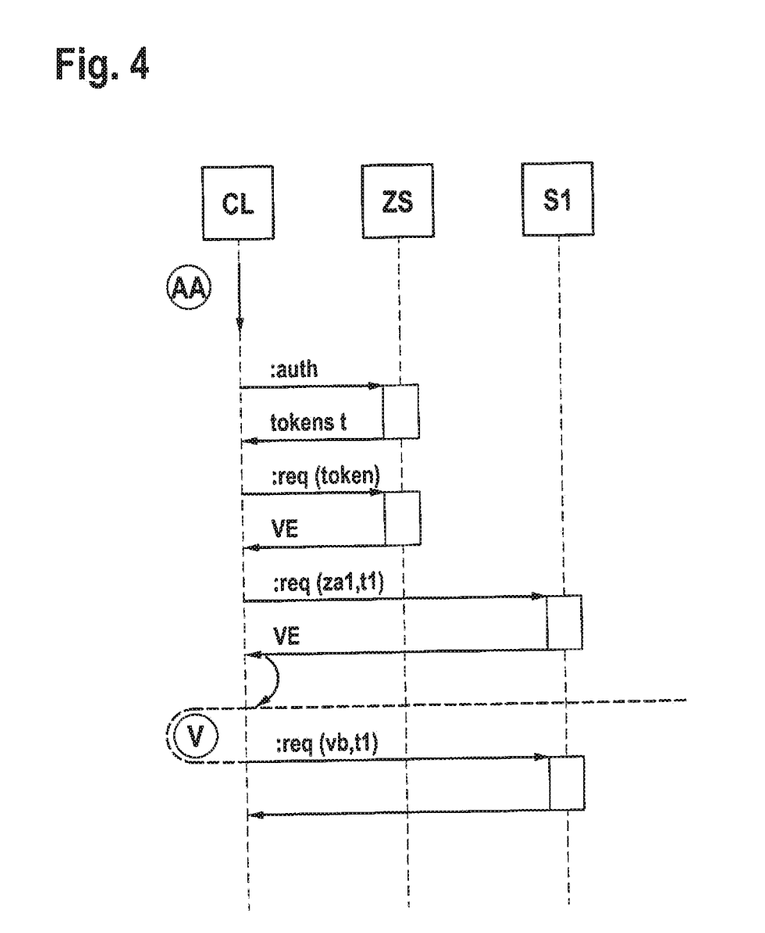
FIG. 4 shows a sequence diagram for a message exchange between the involved entities.

FIG. 4 shows a sequence diagram with the data exchange between client computer CL, central access server ZS and relevant servers S, but only one such application server S is shown in FIG. 4 for reasons of clarity. The method is subdivided into two sections, the first being an authentication and display section, and the second being a management section. Both sections are shown underneath one another in FIG. 4. In response to the authentication query :auth by client computer CL, it receives tokens t if successful, for which it may subsequently request and receive a processing element VE. After receipt of processing element VE, client computer CL may use it to direct a query, already authenticated by the also supplied token t1, to server S or to the also supplied access address za1 with: request (za1, t1). In response to the query, client computer CL receives a further processing element VE. This method is continued in a recursive manner or the respective processing elements VE are built up recursively until all also delivered access addresses za have been processed and the data page is able to be fully set up. In the next section, the user is able to manage the user data conveyed and displayed to him.

Toward this end, he may utilize delete, edit and/or correct commands. The entirety of all commands made available may be referred to as management commands, which are able to be provided in a management element. In this way, the user is able to transmit a query, correspondingly authenticated via token t, for the management of the data to one or a plurality of target server(s) using: request (management command, t1). During a session, the user is of course able to change or correct or delete his respective personal user data on a plurality of servers S. He may use different dedicated management commands for this purpose so that the data on a first server S1 are completely deleted and the data are simply corrected on a second server S2 and not modified at all on a third server S3.

Figure 5:
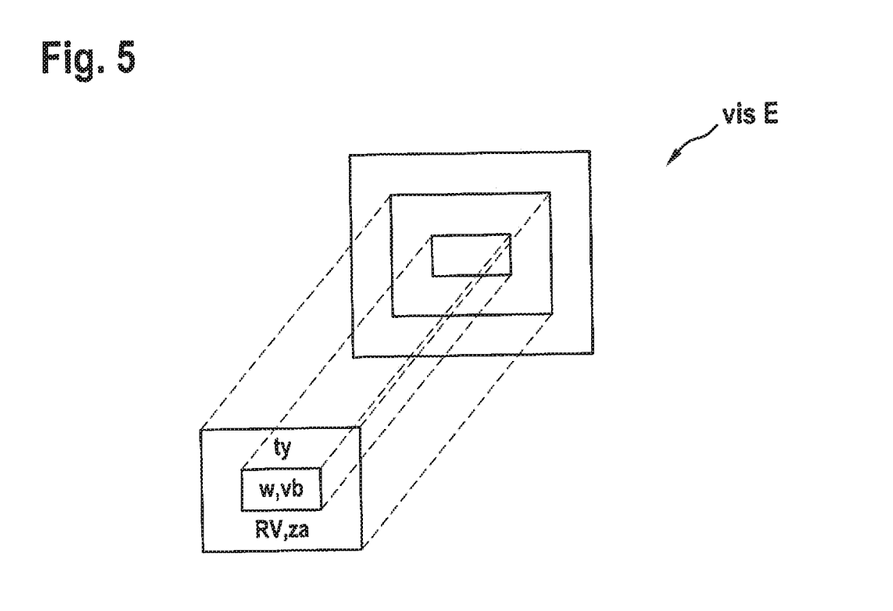
FIG. 5 shows a schematic illustration of the visual element.

FIG. 5 shows the structure or development of a visual element visE. It includes a description of an information type ty of computer network RV (e.g., location data of a user or spoken commands). In addition, further elements, in particular management elements including management commands, e.g., for the processing or deletion, may be included. Moreover, a further element may be encompassed including an indication of a value w (e.g., a location or multiple historical locations of the user, encoded as WGS84, or specific spoken commands as MP3) and one or more management commands vb as well as the indication of computer network RV or access addresses za of the server(s) S. Embedded visual elements visE include at least one display of at least one personal item of information of the user. Overall, the final data page is thus set up step by step once all visual elements visE have been received from all servers S. It is conceivable that a type of form page is created whose entries are then filled in successively. A visual element visE may have a quasi-recursive structure and in turn include at least one embedded further visual element visE. A visual element may represent the values w either directly (point on a map) or display a link to these values (control element for replaying a sound recording).

If the user selects one of the management elements with management commands vb for the adaptation, then the resulting query is usually sent directly from client computer CL to involved server S, as shown in the lower part of FIG. 4, at least if management commands vb are part of embedded visual element visE. This may involve an http query, for instance, which includes the parameters of the user instruction as a POST parameter.

Figure 6:
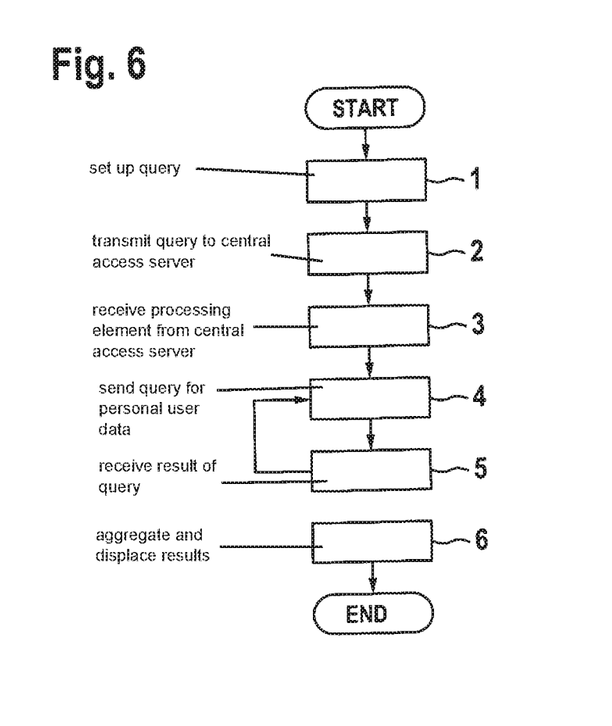
FIG. 6 shows a flow diagram of a method for the composition of personal user data according to an advantageous embodiment of the present invention.

FIG. 6 shows a flow diagram for a method for the composition of personal user data of different services and servers S on a client computer CL. After the start, a query for the composition is set up in step 1. In step 2, the query is transmitted to central access server ZS. Central access server ZS then coordinates relevant servers S to send their personal user data to client computer CL, directly and without further user interaction. In principle, it should be pointed out that an authentication does actually take place but no user inputs are required to do so. OAuth tokens are used for this purpose, which are transmitted from the client to the servers. In addition, central access server ZS generates a processing element VE, which is received on client computer CL in step 3. In step 4, client computer CL is then able to send a query for personal user data to first server S which is indicated in received processing element VE. A token t (which is optionally also part of processing element VE) may be used to authenticate the query. In step 5, a result of the query with the respective personal user data of server S is received on client computer CL. Steps 4 and 5 are repeated until all server addresses have been queried. In step 6, all results are able to be aggregated and displayed and output according to the specifications of processing element VE and especially in visual element visE, in the data page as a composition on user interface UI.

In summary, an important advantageous effect of the approach introduced here may sometimes be seen in that the user obtains an overview of all his personal user data of different services and servers S in a shared display, using only a single authentication (vis-à-vis central access server ZS) and only a single query. This provides better security because the composition of the personal user data is carried out directly and locally on client computer CL. A transmission of access data (password and the like) or of the personal data itself is not required and is also not carried out.

In conclusion, it should be pointed out that the description of the present invention and the exemplary embodiments generally should not be considered a limitation with regard to a certain physical realization of the present invention. All features described and illustrated in connection with individual embodiments of the present invention may be provided in a different combination in accordance with the present invention in order to simultaneously realize their advantageous effects. Therefore, the scope of the present invention also encompasses the provision of other management commands, alternatively or cumulatively, for the deletion and correction of the personal user data—e.g., for an expansion of the personal user data. The method may be carried out in its entirety on client computer CL such as through a browser application. However, one skilled in the art will particularly understand that other architectures which feature distributed processing may be used as well (e.g., to the effect that individual commands or specifications are also initiated on central access server ZS), without departing from the present invention.

The protective scope of the present invention is not limited by the features described in the specification or illustrated in the figures.

What is claimed is:

1. A method for a client computer for a local composition of a data page having personal user data for a number of services accessed by a user and provided on a number of servers, a central access server from among the number of servers being defined and set up to serve as an access node for the client computer, the method comprising steps of:

setting up a query for the local composition of the data page by the client computer, the query being prepared for a transmission from the client computer to the central access server;

receiving a processing element on the client computer and from the central access server in response to the query being transmitted to the central access server, the processing element including access addresses to respective servers from among the number of the servers that are relevant for the query and at least one visual element, the processing element further including control commands, which are processed by the client computer;

after the receiving of the processing element, automatically sending by the client computer to the respective servers, queries for the personal user data, and queries of the client computer to the access addresses included in the processing element being coordinated in a way that the personal user data on the respective servers to be aggregated for the composition of the data page are delivered directly to the client computer for the local composition.

2. The method as recited in claim 1, wherein delivery of personal user data of the respective servers to the client computer takes place without an individual, direct, user-interaction-based authentication of the client computer via the respective servers but exclusively indirectly via a central authentication of the client computer vis-à-vis the central access server.

3. The method as recited in claim 1, wherein the composition includes a read or write access to at least one of the respective servers.

4. The method as recited in claim 1, wherein the visual element includes at least one management element for managing respective personal user data of respective server.

5. The method as recited in claim 1, wherein the processing element includes further tokens for an authentication.

6. The method as recited in claim 1, wherein the data page is an HTML page and the personal user data are received as a result of the query to the central access server and embedded in the visual element.

7. The method as recited in claim 1, wherein queries of the client computer to the respective servers indexed via the access addresses are authenticated.

8. The method as recited in claim 7, wherein the authentication of the queries of the client computer are performed via tokens which are made available to the client computer by the central access server.

9. The method as recited in claim 1, wherein the client computer is induced, after receiving the processing element, to transmit authenticated queries to the respective servers indexed via the access addresses to acquire the personal user data of the respective server.

10. The method as recited in claim 1, wherein the client computer communicates with the central access server according to a single-sign on protocol, the protocol being an Open Authorization (OAuth) protocol.

11. The method as recited in claim 1, wherein queries of the client computer to the respective servers for access to the personal user data stored thereon do not require any individual user interaction or log-in procedures at the respective servers.

12. The method as recited in claim 1, wherein the processing element is a HyperText Markup Language (HTML) page having embedded frames that reference Uniform Resource Locator (URL).

13. The method as recited in claim 1, wherein after all control commands included in the processing element has been processed, all visual elements with the personal user data detected by the respective servers are displayed on a user interface of the client computer.

14. A non-transitory computer-readable storage medium on which is stored a computer program for a client computer for a local composition of a data page having personal user data for a number of services accessed by a user and provided on a number of servers, a central access server from among the number of servers being defined and set up to serve as an access node for the client computer, the computer-program, when executed by a computer, causing the computer to perform steps of:

setting up a query for the local composition of the data page by the client computer, the query being prepared for a transmission from the client computer to the central access server; and receiving a processing element on the client computer and from the central access server in response to the query being transmitted to the central access server, the processing element including access addresses to respective servers from among the number of the servers that are relevant for the query and at least one visual element, the processing element further including control commands, which are processed by the client computer;

after the receiving of the processing element, automatically sending by the client computer to the respective servers, queries for the personal user data, and queries of the client computer to the access addresses included in the processing element being coordinated in a way that the personal user data on the respective servers to be aggregated for the composition of the data page are delivered directly to the client computer for the local composition.

15. The non-transitory computer-readable storage medium as recited in claim 14, wherein the computer program is a browser application on the client computer.

16. A system for a local composition of a data page on a client computer, the data page being a composition of personal user data for a number of services, the system comprising:

the client computer which includes a client-side access interface for interaction with a central access server and which is in a data exchange with a number of servers;

the number of servers which provide the number of services to a user for use on the client computer; and the central access server which is defined from among the number of servers and set up to function as an access node for the client computer, the central access server including a server-side access interface for the interaction with the client computer;

wherein the client computer is configured to: (i) generate a query for the composition of the data page and send the query to the central access server, and (ii) receive a processing element in response to the query being sent to the central access server, the processing element includes access addresses to particular servers from among the number of servers that are relevant for the query and at least one visual element, the processing element including control commands that are processed by the client computer, and after the receiving of the processing element, automatically send to the particular servers, queries for the personal user data; and wherein the central access server is configured to set up the particular servers so that queries directed to the particular servers by the client computer are coordinated in a way that the personal user data on the particular servers to be aggregated for the composition of the data page are delivered directly to the client computer for the local composition.

* * * * *